United States Patent [19]
Vest, Jr.

[11] 3,980,141
[45] Sept. 14, 1976

[54] MOLDBOARD PLOW

[75] Inventor: Robert C. Vest, Jr., Stanton, Tex.

[73] Assignee: Stanton Supply Corporation, Stanton, Tex.

[22] Filed: June 6, 1974

[21] Appl. No.: 476,925

[52] U.S. Cl.................................. 172/225; 172/762; 172/775
[51] Int. Cl.² ..................... A01B 3/44; A01B 15/00; A01B 15/14
[58] Field of Search ......................... 172/224–227, 172/773–775, 204, 206, 209, 210, 213, 215, 218, 223, 232, 776, 762

[56] References Cited
UNITED STATES PATENTS

| | | | |
|---|---|---|---|
| 2,913,059 | 11/1959 | Toland et al. | 172/224 |
| 3,123,151 | 3/1964 | Quickstad | 172/227 |
| 3,219,125 | 11/1965 | Wenzel | 172/225 |
| 3,307,635 | 3/1967 | Ward | 172/225 |
| 3,524,509 | 8/1970 | Richey | 172/225 X |
| 3,583,493 | 6/1971 | Wadelton | 172/225 |
| 3,625,293 | 12/1971 | Nelson | 172/212 |
| 3,730,279 | 5/1973 | Dowdeswell | 172/212 |

FOREIGN PATENTS OR APPLICATIONS

| | | | |
|---|---|---|---|
| 1,006,493 | 4/1952 | France | 172/224 |

*Primary Examiner*—Edgar S. Burr
*Assistant Examiner*—Steven A. Bratlie
*Attorney, Agent, or Firm*—Wendell Coffee

[57] ABSTRACT

A five, six, or seven bottom two-way reversible moldboard plow is made to be attached by a standard three-point hitch on a tractor and lifted by the hitch without the aid of a trailing wheel. This is accomplished by mounting the plow as far forward as possible so the first plow is well forward of the bearing. Also, an improved brace is placed upon the side plates supporting the plow shank.

10 Claims, 7 Drawing Figures

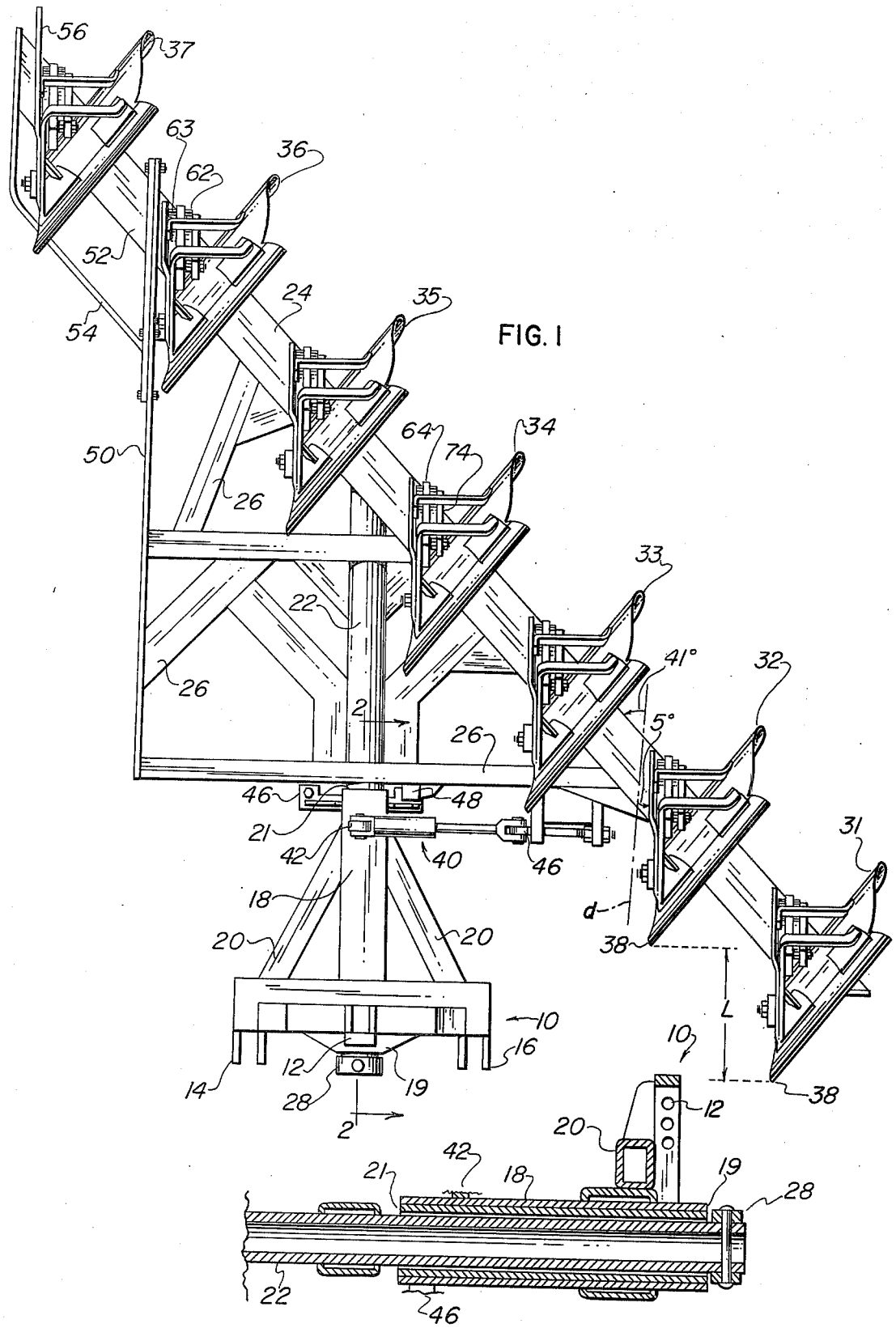

MOLDBOARD PLOW

BACKGROUND OF THE INVENTION

1. Field of the Invention

This invention relates to plows and more particularly to two-way moldboard plows which are reversible about a longitudinal axis.

2. Description of the Prior Art

Agricultural tractors in use today are capable of pulling six and seven bottom plows.

In modern agriculture, it is desirable that the plows be mounted to a standard three-point hitch. Also in common use are reversible or two-way gang plows. However, until this invention, a five, six, or seven bottom two-way gang plow which could be mounted upon the three-way hitch and be supported by wheels when in the carried position had not been commercially successful.

SUMMARY OF THE INVENTION

1. New and Different Function

I have invented a two-way reversible gang plow having five or six or seven bottoms which can be mounted upon a three-point hitch and be unsupported by wheels when in the carried position.

I have been able to accomplish this by having a longitudinal bushing bearing whereby the plow is rotated from one position to the other. Even with the elongated bearing structure, it has been necessary to place the forward plow forward of the bearing structure. Also, the plow has been balanced about the bearing structure, reducing the force required on the hydraulic cylinder to turn it. Furthermore, I have found in seven bottom plows of this type that because of the massive power of the tractor, it is necessary to provide for more bracing of the plates supporting the plow shanks to prevent them from buckling when obstructed.

2. Objects of the Invention

An object of this invention is to plow land.

Other objects are to achieve the above with a device that is sturdy, compact, durable, lightweight, simple, safe, efficient, versatile, and reliable, yet inexpensive and easy to manufacture, install, adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 1 is a top plan view of a reversible two-way gang plow according to this invention.

FIG. 2 is a longitudinal section through the main bearing taken on line 2—2 of FIG. 1.

Figure 3:
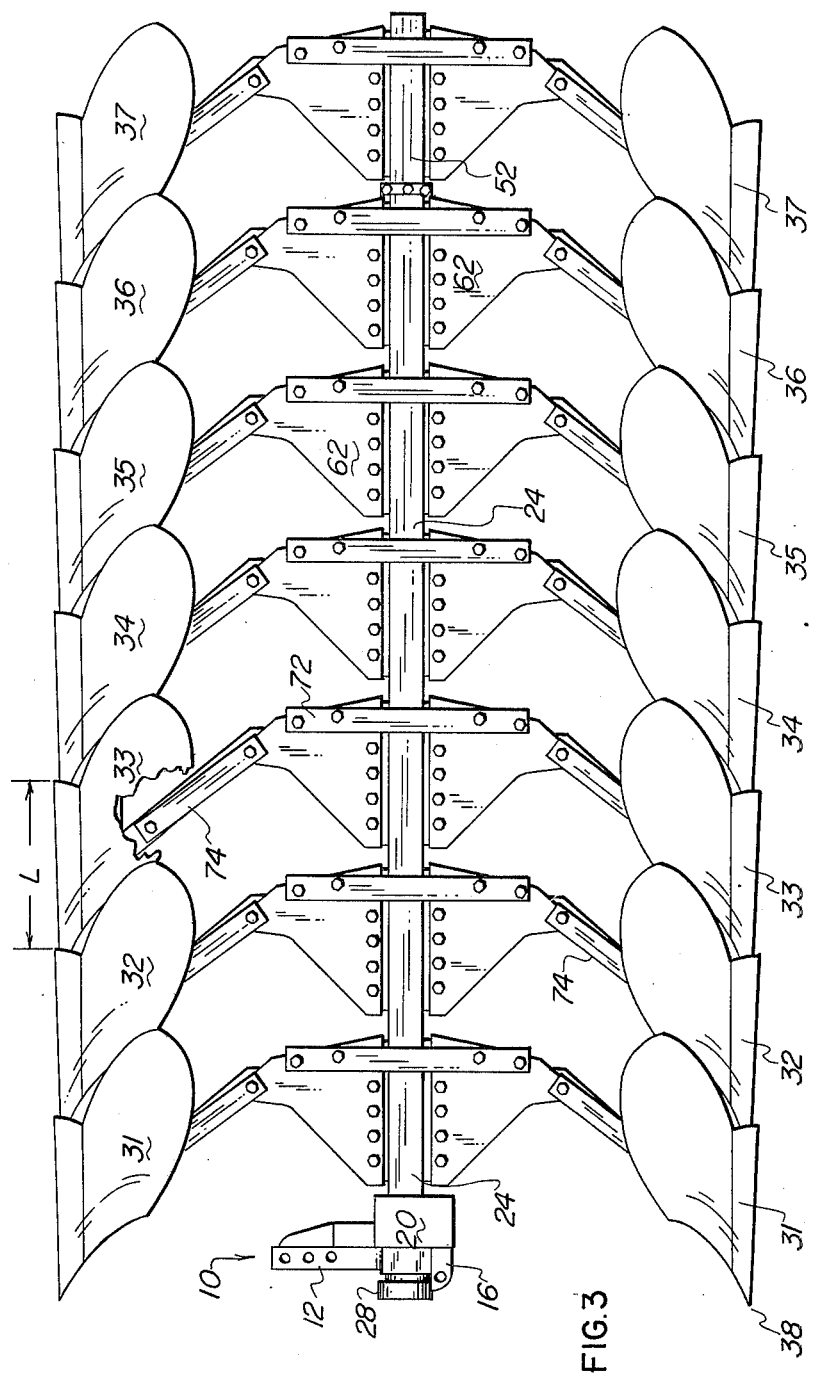
FIG. 3 is a side elevational view of the plow.
Figure 4:
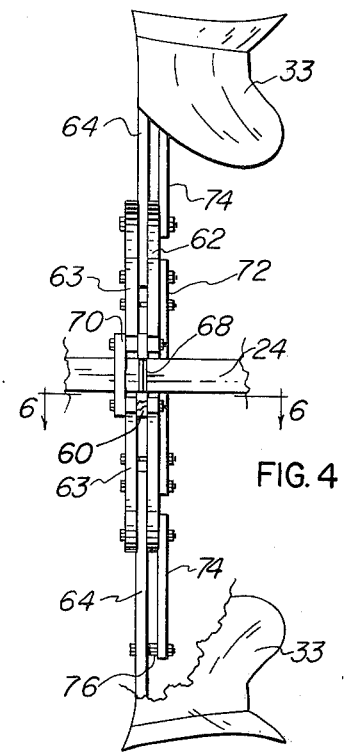
FIG. 4 is a front elevational view of one plow shank with the bracing thereon, with parts broken away for clarity.
Figure 7:
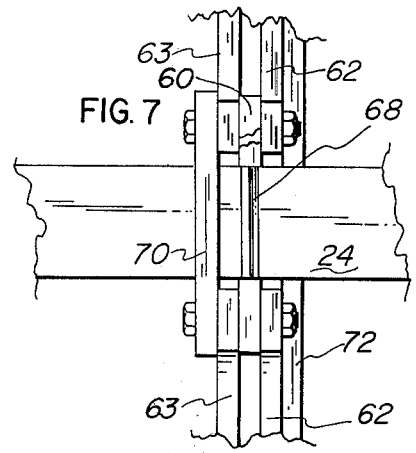
FIG. 7 is an enlarged detail of the attachments of the said plates to the main plow beam similar to what is shown in FIG. 4, with parts broken away for clarity.
Figure 6:
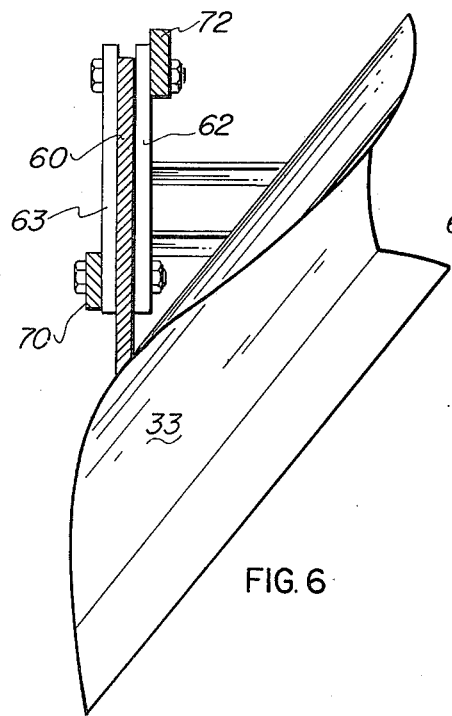
FIG. 6 is a sectional plan view taken substantially on line 6—6 of FIGS. 4 and 5.
Figure 5:
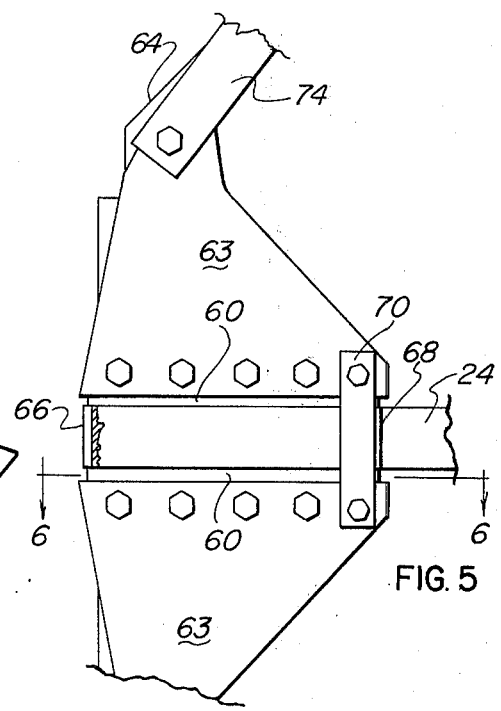
FIG. 5 is a side elevational view of one pair of plow shanks showing the bracing thereon.

Referring to the drawings, the total implement has a standard three-point hitch 10. As used in this application, the term "three-point hitch" refers to the standard connection by which implements are customarily attached to tractors or other draft vehicles. The standard three-point hitch forms means for lifting the plow and for pulling the plow in the direction of draft. The hitch, basically, has a horizontal pin or connection 12 on the center line of the draft vehicle. At a lower elevation and laterally spaced are two additional pins or horns 14 and 16. The two additional pins 14 and 16 are slightly forward of the upper center pin 12. In some instances the pins are carried on the tractor and, in some instances, on the implement, but those skilled in the art understand that the reference to a three-point hitch includes the structure by which these three pins are connected. The three-point hitch forms an upright plane traverse to the direction of draft. It is in this plane that the connection between the tractor and the implement is made. Therefore, it forms a convenient basis for reference.

Bearing tube 18 is connected to the three-point hitch. Hitch bracing 20 braces the bearing tube 18 to the hitch 10.

The bearing tube 18 has a forward end 19 which is forward of the above defined plane of the three-point hitch 10. The bearing tube 18 is aligned with the direction of draft, shown as line $d$ in FIG. 1. The after end 21 of the bearing tube 18 is located behind the forward end 19. As illustrated, the bearing tube 18 is not a single unitary tube, but includes an outer tube and an inner tube. It will be understood that the tube as well as the hitch 10 is of quite strong and rugged construction inasmuch as the tube transmits the entire power and draft from the tractor to the implement.

Shaft 22 is journaled within the bearing tube 18. Therefore, the shaft 22 is also aligned with the direction of draft. The shaft is attached to main plow beam 24. The main plow beam 24 is mounted at an acute angle to the shaft 22 and, therefore, to the bearing tube 18. Main bracing 26 extends from the shaft 22 to the main plow beam 24.

The hitch bracing 20 and the main bracing 26 are both truss-type bracing.

Collar 28 surrounds the shaft 22 forward of the forward end 19 of the bearing tube 18. Collar 28 is attached to the shaft 22 as by a diametrical pin extending through holes in both the collar and shaft. Analysis will show that the draft of the tractor transmitted to the plows will be carried by the bearing of the collar 28 against the forward end 19 of the bearing tube 18. When the implement is lifted from the ground, the entire weight of the implement is carried by the bearing tube 18. Grease fittings (well known) are provided upon the bearing tube for lubrication of the shaft within the bearing tube.

The implement as described to this point has been commercially on the market for over one year before this application and, as described to this point, is within the skill of the art.

As illustrated, fourteen plow bottoms are attached to the main plow beam 24. Seven are upon one side of the plow beam, forming one gang of plows, and seven are on the opposite side, forming another gang of seven plows. As seen, the plows are attached in serial pairs, i.e., one plow of each gang. As designated, the front or first plow is designated plow 31, the second plow 32, the third 33, etc., until the last plow is designated as plow 37. Also, the first pair of plows will be the pair including the two plows 31 and the second pair of the plows will include the two plows 32, etc. As a matter of construction, the main plow beam 24 will be angled at about 41° to the direction of draft. The uniform spacing of each plow to the next, along the beam, is called the beam spacing. When spacing from one plow to the next is described, whether it is along the beam or in the direction of draft or laterally, it is meant that distance from an element on one plow to the corresponding element on the adjacent plow. By longitudinal spacing, it is meant the spacing parallel to the direction of draft. E.g., using the tip 38 of one of the plow bottoms as the reference point, it would mean the distance parallel to the direction of draft from the tip 38 of one plow bottom to a line at right angles to the direction of draft intercepting the tip 38 of an adjacent plow bottom. The longitudinal distance is shown in FIGS. 1 and 3 as L.

Because of the weight of the plow carrying five or more plow bottoms, it is necessary to make the length of the bearing tube 18 longer than the longitudinal spacing L.

Although it is not clearly shown on the drawing, I have found it desirable to set the plows at about a 5° angle to the direction of draft shown as line $d$ on the drawings. As stated before, the main plow beam is at an acute angle to the direction of draft. I have found it desirable to put the main plow beam at about 41° to the direction of draft as shown in FIG. 1. Then with the plows set at 5° of the direction of draft, this means that the plows are mounted on the plow beam at about a 36° angle to the plow beam 24. The plows will have a spacing along the plow beam of about 32½ inches and, therefore, a longitudinal spacing of about 24¼ inches and a lateral spaceing of about 21½ inches. The length of the bearing tube, i.e., the length from the forward end 19 to the after end 21, is made 48 inches for a plow having seven bottoms to a gang as illustrated, or is made 36 inches for a plow having a gang of six bottoms. In either case, it may be seen that the length of the bearing tube is longer than the longitudinal spacing or the lateral spacing or, as a matter of fact, the length of the bearing tube will be longer than the spacing along the plow beam 24.

Also, it may be seen that the tip 38 of the first plow is forward of the upright plane through the hitch 10. It is also forward of a line perpendicular to the direction of draft through the forward end 19 of the bearing tube 18. The first plow 31 is forward of the after end 21 of the bearing tube. By this it is meant that it is forward of a line perpendicular to the direction of draft through the after end of the bearing tube. In fact, a line perpendicular to the direction of draft through the after end of the bearing tube will intersect the second plow 32 and the third plow 33.

Hydraulic cylinder 40 extends from ear 42 on the top of the bearing tube 18 to an eye 44 attached to the main bracing 26 which is attached to the main plow beam 24.

Those skilled in the art will understand that the cylinder would be attached by conventional hydraulic hoses (not shown) to an operating valve on the tractor and that proper operation of the valve will cause the plow to reverse or turn over as is well known in the art.

The implement is balanced about the axis of the shaft 22 so that it is turned easily the cylinder 40.

Platform 46 with adjustable stops upon the bottom of the bearing 18 will cooperate with stop 48 upon the main bracing 26 to properly position the plow beam 24 in a horizontal position. The hydraulic cylinder 40 and the stops 46 and 48 are all well known to the art.

Also well known to the art is the expediency of providing a structural member 50 parallel to the direction of draft and at the rear end of the main beam 24. Auxiliary main beam 52 is attached with auxiliary bracing 54 to the main beam 24. If an operation is desired with six bottoms at one event, the auxiliary main beam 52 may be removed; therefore, the plows will plow with bottoms 31 through 36. Stated otherwise, it is possible to remove the bottom 37 from the gang. However, assuming that the bottom 37 is upon the gang, the landslide 56 is longer upon the bottom 37 than the remaining ones. It will be understood by those skilled in the art that the landslide of the last plow 37 will be operating against harder dirt than the remaining ones.

It may be seen, as I have described, that I have provided the object of having a reversible gang of seven plows mounted upon a three-point hitch.

A tractor with sufficient power to pull seven bottoms is a tractor having enormous draft and power. Therefore, if one plow bottom hits an obstacle, the tractor has the power and draft to continue to go forward. This is contrasted with a two-bottom tractor and plow. I.e., the tractor having the power and draft to pull two plow bottoms has much less power; therefore, if one of the plows strikes an obstruction, the tractor will be stalled or stopped.

The plow shanks and the connection of the plow bottoms to the main plow beam must be much studier for the plows of a seven-gang plow than for a smaller gang. The connection of the plows and shanks to the main plow beam 24 is particularly shown in FIGS. 4, 5, 6, and 7. Bar 60 is attached as by welding to the top and bottom of the main plow beam 24. As stated before, this bar is attached at about a 36° angle to the main plow beam 24. With the main plow beam on the hitch, the bar 60 will have about a 5° angle to the direction of draft. Side plate 62 is attached by bolting to the plow side of the bar 60. Side plate 63 is attached by bolting to the land side of the bar 60. The plow shank or beam foot 64 is connected between the two side plates 62 and 63 and the plow bottom is connected to the beam foot as is standard and according to the manufacture of moldboard plow bottoms. Tie bars 66 connect the bars 60 at the rear of the main beam 24 and tie bars 68 connect the bars 60 at the forward side of the main beam 24.

To reinforce the side plates, front reinforcing foot 70 is bolted to the side plates 63 on the land side in front of the main beam 24. Rear reinforcing foot 72 is bolted to the side plates 62 on the plow side to the rear of the main beam 24. These front and rear reinforcing feet prevent the side plates 62 from buckling or bending so easily under heavy loads. Likewise, beam foot reinforcing bar also called bottom beam reinforcer 74 is attached along the side plate 62 on the plow side from the bottom of the side plate 62 along the beam foot 64 to near the plow bottom 33. At the bottom of the bottom beam reinforcer 74, spacer 76 is placed between the reinforcer and the beam foot 64 and bolted in place.

Thus, it may be seen that I have provided and attained the objects stated above.

The embodiment shown and described above is only exemplary. I do not claim to have invented all the parts, elements or steps described. Various modifications can be made in construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

SUBJECT MATTER CLAIMED FOR PROTECTION

I claim as my invention:
1. In a two-way reversible plow having
   a. a three point hitch,
   b. said hitch forming means for lifting the plow and for pulling the plow in a direction of draft,
   c. a bearing tube having
      i. a forward end and
      ii. an after end,
   d. said tube attached to said hitch parallel to said direction of draft,
   e. hitch bracing between said hitch and said tube,
   f. a shaft journaled into said tube,
   g. a main plow beam attached to said shaft at an acute angle thereto,
   h. main bracing between said shaft and said main plow beam, and
   j. a hydraulic cylinder extending between said tube and said main bracing,
   k. said hydraulic cylinder forming means for rotating said shaft within said tube whereby the main plow beam is reversed,
   m. THE IMPROVEMENT COMPRISING IN COMBINATION WITH THE ABOVE:
   n. at least ten plow bottoms attached to said plow beam in pairs with one plow of each pair on each side of said beam, so that there are two gangs of plows, each gang having at least five plows,
   o. the first of said pairs forward of the after end of said bearing tube, and
   p. a plane perpendicular to the direction of draft through the after end of said bearing tube passing behind the first of said pairs and intersecting the second of said pairs from front of the gang.
2. The invention as defined in claim 1 with an additional limitation of
   q. the plane perpendicular to the direction of draft through the after end of said bearing tube also intersects the third of said pairs from front of the gang.
3. The invention as defined in claim 1 above wherein
   q. the distance parallel to the direction of draft from an element on one plow to the corresponding element on the adjacent plow is called the longitudinal spacing, and
   r. the bearing tube is longer than said longitudinal spacing.
4. The invention as defined in claim 1 wherein
   q. The distance parallel to the main plow beam from an element on one plow to the corresponding element on the adjacent plow is called the beam spacing, and
   r. said bearing tube is longer than the beam spacing.
5. In a two-way reversible gang plow having
   a. a main plow beam,
   b. a first gang of plows with bottoms mounted on one side of the main plow beam,
   c. a second gang of plows with bottoms mounted on the other side of the main plow beam,
   d. said plows attached to the beam in pairs,
   e. means attached to the main plow beam for reversing the main plow beam so that the gangs of plows are reversed,
   f. a beam foot attached to each plow bottom,
   g. two side plates,
      i. one on the land side and
      ii. one on the plow side of each beam foot
      iii. bolted to each beam foot, and
   h. a bar attached to the main plow beam for each bottom,
   j. the side plates attached to the bar;
   k. THE IMPROVED STRUCTURE FOR REINFORCING THE SIDE PLATES AND TO THE MAIN BEAM COMPRISING:
   m. a front reinforcing foot attached from the side plate on the land side of one gang to the side plate on the land side of the other gang at each pair,
   n. the front reinforcing foot located in front of the main plow beam,
   o. a rear reinforcing foot attached from the side plate on the plow side of one gang to the side plate on the plow side of the other gang at each pair,
   p. the rear reinforcing foot located in rear of the main plow beam, and
   q. a beam foot reinforcing bar
   r. bolted at its top to the side plate on the plow side, and
   s. bolted at its bottom through a spacer to the beam foot.
6. The invention as defined in claim 5 wherein said means for reversing the main plow beam includes:
   t. a three point hitch,
   u. said hitch forming means for lifting the plow and for pulling the plow in a direction of draft,
   v. a bearing tube having
      i. a forward end and
      ii. an after end,
   w. said tube attached to said hitch parallel to said direction of draft,
   x. hitch bracing between said hitch and said tube,
   y. a shaft journaled into said tube,
   z. said main plow beam attached to said shaft at an acute angle thereto,
   aa. main bracing between said shaft and said main plow beam, and
   bb. a hydraulic cylinder extending between said tube and said main bracing,
   cc. said hydraulic cylinder forming means for rotating and thus reversing the main plow beam about the axis of said tube,
   dd. each of said first and secong gang of plows having at least five plows therein, and
   ee. the front or first of said pairs forward of the after end of said bearing tube.
7. The invention as defined in claim 6 wherein
   ff. the distance parallel to the direction of draft from an element on one plow to the corresponding element on the adjacent plow is called the longitudinal spacing, and
   gg. the bearing tube is longer than said longitudinal spacing.
8. The invention as defined in claim 11 wherein
   hh. the distance parallel to the main plow beam from an element on one plow to the corresponding element on the adjacent plow is called the beam spacing, and
   jj. said bearing tube is longer than the beam spacing.

9. The invention as defined in claim 8 with an additional limitation of
kk. a plane perpendicular to the direction of draft through the after end of said bearing tube intersects the second plow from front of the gang.

10. The invention as defined in claim 9 with an additional limitation of
mm. a plane perpendicular to the direction of draft through the after end of said bearing tube also intersects the third plow from front of the gang.

* * * * *